(12) United States Patent
Giese et al.

(10) Patent No.: US 10,799,986 B2
(45) Date of Patent: Oct. 13, 2020

(54) WIDE PATH WELDING, CLADDING, ADDITIVE MANUFACTURING

(71) Applicant: Illinois Tool Works Inc., Glenview, IL (US)

(72) Inventors: William R. Giese, Monee, IL (US); Erik Miller, Verona, WI (US); Kirk Stema, Hudsonville, MI (US); Shuang Liu, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 613 days.

(21) Appl. No.: 15/193,865

(22) Filed: Jun. 27, 2016

(65) Prior Publication Data

US 2017/0368637 A1   Dec. 28, 2017

(51) Int. Cl.
| | |
|---|---|
| *B23K 26/211* | (2014.01) |
| *B23K 15/00* | (2006.01) |
| *B23K 26/073* | (2006.01) |
| *B23K 26/08* | (2014.01) |
| *B23K 26/06* | (2014.01) |
| *B23K 26/21* | (2014.01) |
| *B23K 26/342* | (2014.01) |
| *B23K 9/10* | (2006.01) |

(52) U.S. Cl.
CPC .......... *B23K 26/211* (2015.10); *B23K 9/1093* (2013.01); *B23K 15/004* (2013.01); *B23K 15/0046* (2013.01); *B23K 15/0086* (2013.01); *B23K 26/0604* (2013.01); *B23K 26/0608* (2013.01); *B23K 26/0617* (2013.01); *B23K 26/0732* (2013.01); *B23K 26/083* (2013.01); *B23K 26/0846* (2013.01); *B23K 26/21* (2015.10); *B23K 26/342* (2015.10)

(58) Field of Classification Search
CPC .... B23K 26/211; B23K 26/21; B23K 26/342; B23K 9/1093; B23K 15/004; B23K 15/0046; B23K 15/0086; B23K 26/0604; B23K 26/0608; B23K 26/0617; B23K 26/0732; B23K 26/083; B23K 26/0846
USPC ............... 219/121.66, 138, 73.2, 76.1, 76.14
See application file for complete search history.

(56) References Cited

U.S. PATENT DOCUMENTS

| | | | |
|---|---|---|---|
| 9,315,903 B2 | 4/2016 | Bruck | |
| 2002/0021723 A1* | 2/2002 | Amako | B23K 26/0604 372/23 |
| 2013/0142965 A1* | 6/2013 | Bruck | C23C 24/106 427/597 |
| 2014/0008343 A1 | 1/2014 | Ash | |
| 2014/0042131 A1* | 2/2014 | Ash | B23K 1/0056 219/121.66 |
| 2015/0209908 A1 | 7/2015 | Peters | |

OTHER PUBLICATIONS

Extended European Search Report Appln No. 17169211.4 dated Dec. 1, 2017 (8 pages).

* cited by examiner

*Primary Examiner* — Phuong T Nguyen
(74) *Attorney, Agent, or Firm* — McAndrews, Held & Malloy, Ltd.

(57) ABSTRACT

A welding or cladding apparatus in which one or more energy beam emitters are used to generate a wide beam spot transverse to a welding or cladding path, and one or more wide feeders feed wire to the spot to create a wide welding or cladding puddle.

14 Claims, 11 Drawing Sheets

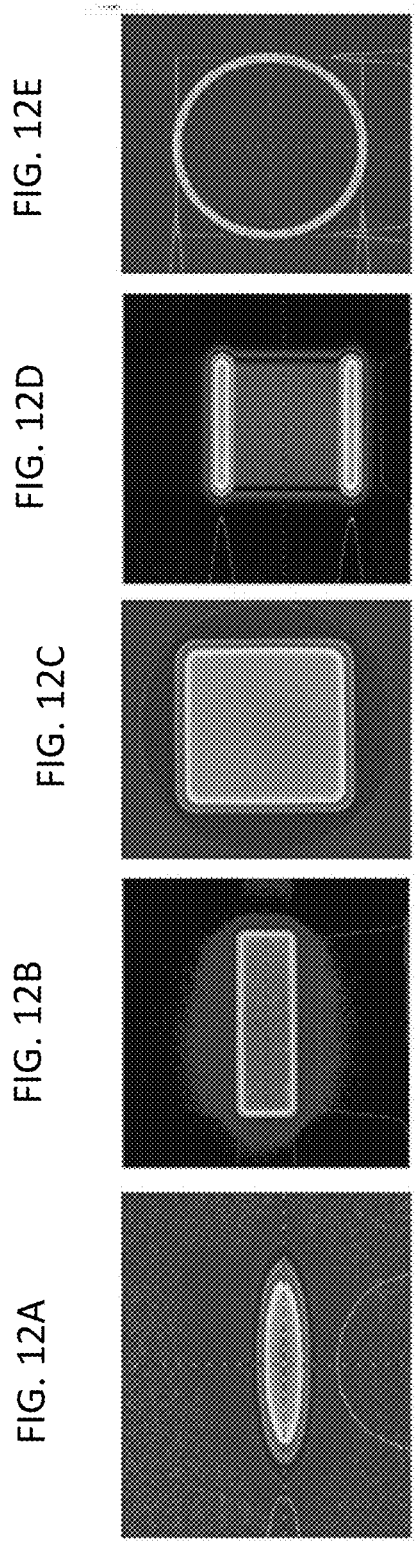

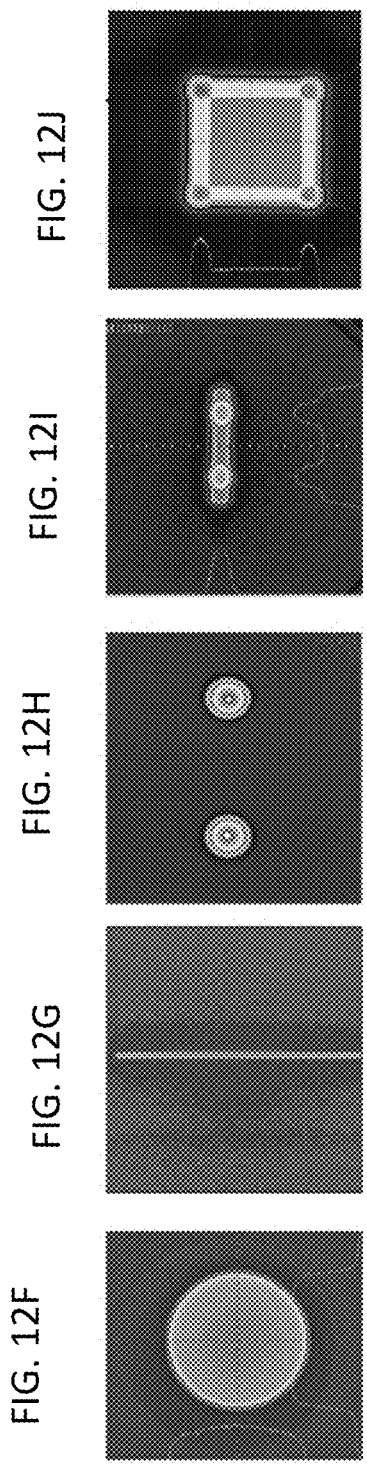

WIDE PATH WELDING, CLADDING, ADDITIVE MANUFACTURING

The present disclosure generally relates to metalworking applications such as welding and cladding applications. The disclosure is particularly suitably in hotwire welding and cladding applications.

BACKGROUND

Various welding and cladding techniques are known. Very popular is the use of powder cladding in which a laser is used to melt a power on a workpiece.

Hot wire welding and hot wire cladding are processes where a metal filler or feeder wire is heated, usually resistively, by passing an electrical current through it. The wire is typically fed in front of or behind a high-power energy source such as a laser or plasma that further melts the wire material along with the base metal of the workpiece to produce a weld or clad. Typically, the energy source produces a spot or footprint with a diameter less than 4 mm on the workpiece.

The resistive heating of the metal filler wire reduces the amount of heat needed for the base metal of a workpiece to which the heated wire is applied. Further, this puts most of the heat into the clad with resistive heating instead of laser beam heating so the laser beam melts the base metal a minimal amount Hence it reduces dilution of the clad material and increases the deposition rate. Beneficially, heating up the wire can rid it of moisture, so when it enters the welding/cladding puddle it's free of porosity, it's clean and the quality is significantly better than cold wire.

The use of hot wire welding, such as gas tungsten arc welding ("GTAW"), also known as tungsten inert gas ("TIG") welding, tends to be more part-related and industry-related. For example, hot wire TIG is used extensively in the transportation and power generation industries. It's big in shipbuilding, and for rebuilding turbine shafts for large power plants. Hot wire TIG also is used in cladding very large valves such as those for oil industry in which welders clad the inside of the valve body with high-performance alloys.

SUMMARY

Disclosed herein are one or more inventions that allow for large surface area welding, cladding or additive manufacturing. This enables for greater welding, cladding or additive metal coverage and/or faster welding, cladding or additive manufacturing processes.

Also disclosed are inventions welding, cladding and additive manufacturing operations using laser beam footprints with variable energy profiles. Variable energy profiles can provide improved distribution of the molten filler or feeder wire.

As used herein, a metalworking operation means a welding operation, a cladding operation, an additive manufacturing operation or any combination of them. Unless specifically noted otherwise, the term "metalworking apparatus" is used generically herein and the accompanying claims to mean any welding apparatus, any cladding apparatus or any additive manufacturing apparatus that performs a metalworking operation, be it a non-hotwire welding apparatus, a hotwire welding apparatus, a non-hotwire cladding apparatus or a hotwire cladding apparatus. Similarly, unless specifically noted otherwise, the term "metalworking process" is used generically to mean any welding, cladding or additive manufacturing process be it a non-hotwire welding process, a hotwire welding process, a non-hotwire cladding process or a hotwire cladding process. Further, the term "spot" is used herein to mean an area or footprint of incidence of one or more high energy beams.

A hotwire is a filler or feeder wire that is preliminarily heated, typically resistively, during application of the wire in a metalworking operation. High power energy is applied to the wire, or the wire and a workpiece, to melt the wire, or the wire and a portion of the workpiece, respectively. An additive manufacturing operation uses molten wire to deposit metal to produce products. An example of an additive manufacturing process is what can be referred to as 3-D printing processes.

In an embodiment, the disclosure provides a metalworking apparatus, comprising an energy beam, preferably a laser beam, emitter and an optical system to shape the beam to have a controlled footprint.

In an embodiment, a width of the footprint on the weld path is larger than 4 mm. Preferably, the footprint is in a shape of a circle, a rectangle, a triangle, a ring, or an ellipse.

In an embodiment, one or multiple feeder wires are fed into the wide footprint. During the wire feeding process, the wire can be fed unwaveringly into the wide footprint or fed staggeringly or waveringly such as in a weaving or spinning motion. In an embodiment, one or multiple energy beams irradiate a workpiece unwaveringly with a wide footprint or staggeringly or waveringly to create a wide welding puddle.

In an embodiment, the disclosure provides a metalworking apparatus, comprising one or more energy beam emitters arranged to irradiate a workpiece and have one or more spots of high energy incident on the workpiece; and one or more wire feeders configured to feed one or more wires to the one or more spots and which when melted by the energy beam or beams form a wide molten metal puddle.

In an embodiment, the apparatus includes a plurality of energy beam emitters arrayed along a straight line.

In an embodiment, the width direction of the spot is orthogonal to the welding path.

In an embodiment, the width direction of the welding puddle is at an oblique angle to the welding path.

In an embodiment, the apparatus includes two or more contiguous spots of high energy incident on the workpiece.

In an embodiment, the apparatus includes a energy beam emitter which emits a wide energy beam.

In an embodiment, the apparatus includes a plurality energy beam emitters which emit energy beams of substantially equal cross-section and intensity.

In an embodiment, each energy beam emitter is a laser.

In an embodiment, the apparatus includes a wire feeder configured to feed a ribbon wire.

In an embodiment, the one or more feeders include circuitry to preheat the one or more wires.

In an embodiment, multiple filler wires can have variable chemical compositions to enable control over the chemical composition of the dads or welds.

In an embodiment, the disclosure provides a method that includes irradiating a workpiece with one or more beams of energy and creating one or more spots of high energy incident on the workpiece; moving the workpiece relative to the one or more spots; and feeding one or more wires to the one or more spots and forming at the one or more spots a wide puddle of molten wire material, wherein, the puddle has width greater than a length, the puddle length extending in a first direction of the relative movement between the workpiece and the one or more spots, the width extending a second direction transverse to the first direction, the width being 4 mm or greater.

In an embodiment, the method includes irradiating the workpiece with an energy beam emitter that emits an energy beam with a rectangular cross section.

In an embodiment, the method includes irradiating the workpiece with a plurality of energy beam emitters arrayed along a line.

In an embodiment, the method includes feeding a ribbon wire to the one or more spots.

In an embodiment, the method includes conducting a current through the one or more fillers wires to cause same to reach a semi-liquidus state while reach the puddle.

In an embodiment, the method includes feeding one or more fillers wires in parallel to a single wide spot.

In an embodiment, the method includes feeding a ribbon wire to a plurality of spots arrayed along a line.

In an embodiment, the spots overlap.

In an embodiment, the beams of energy are laser beams.

In an embodiment, the disclosure provides a metalworking apparatus, comprising: one or more lasers arranged to irradiate a workpiece and have one or more spots of high energy incident on the workpiece; one or more wire feeders configured to feed one or more wires to the one or more spots and which when melted by the one or more beams of energy form a wide welding puddle, the welding puddle having a width in a direction transverse to a direction of a welding path, the width of the welding puddle being greater than a length of the welding puddle in the direction of the welding path; and circuitry for preheating the wires, the width being 4 mm or greater.

These and other aspects of the embodiments are set forth below in the detailed description with reference to the accompanying drawings.

BRIEF DESCRIPTION OF THE DRAWINGS

FIGS. 12A to 12J illustrate further beam cross sections that can be used to generate wide path welding, cladding, or additive manufacturing footprints.

DETAILED DESCRIPTION

Figure 1:
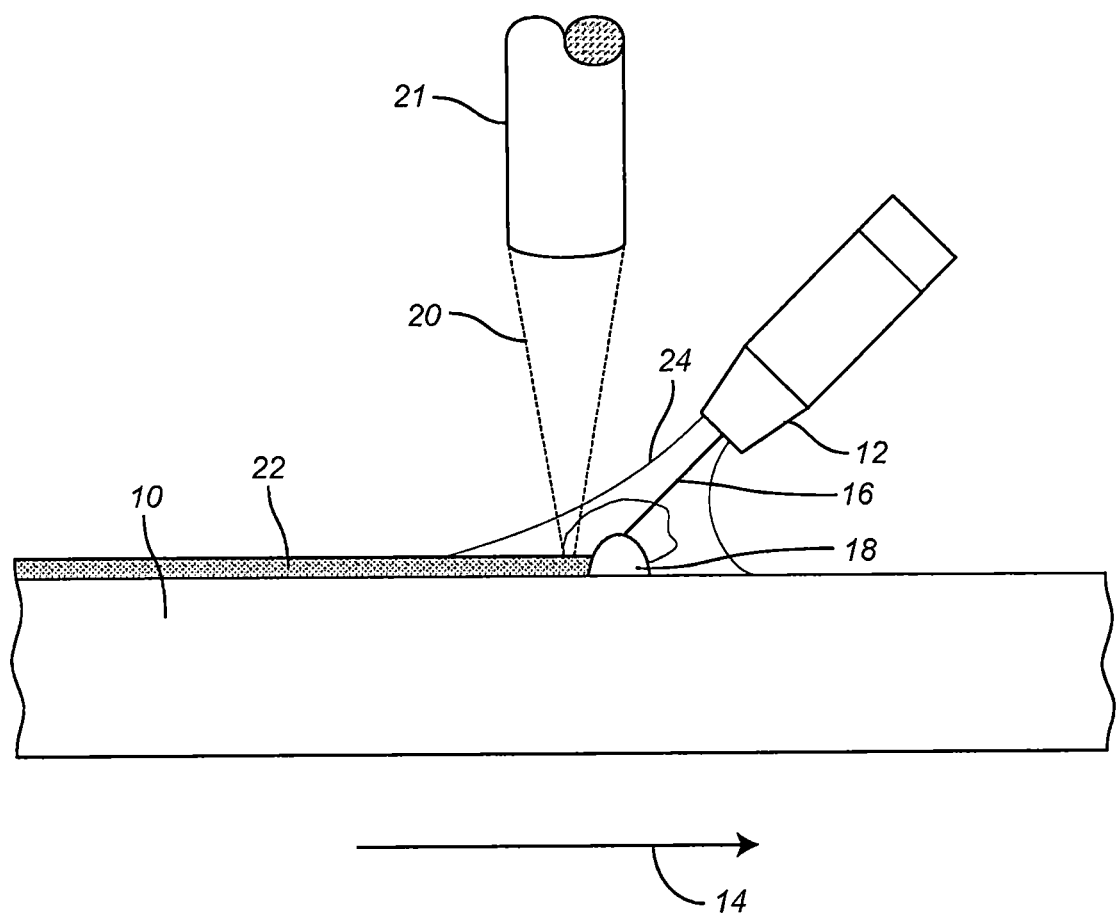
FIG. 1 illustrates in cross section a basic hotwire welding arrangement and process.

The present disclosure is herein described in detail with reference to embodiments illustrated in the drawings, which form a part hereof. Other embodiments may be used and/or other changes may be made without departing from the spirit or scope of the present disclosure. The illustrative embodiments described in the detailed description are not meant to be limiting of the subject matter presented herein.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the present disclosure.

In FIG. 1 there is illustrated a hotwire laser welding process in which one or more principles of the present disclosure can be used. As illustrated, a metallic workpiece 10 and wire feeding nozzle/gun or torch 12 are positioned for relative travel between them. The workpiece 10 is representative of a base metal of any suitable workpiece. The direction of travel of the nozzle 12 relative to the workpiece 10 is indicated by arrow 14.

Note that the relative direction of travel is not necessarily linear. The workpiece 10 could rotate about a horizontal axis, for example a pipe rotating about its cylindrical axis, or it could rotate about a vertical axis, for example, a wheel or disc mounted and rotating in a horizontal plane.

In process steady-state, filler wire 16 is feed out of the nozzle 12 toward a molten pool or puddle 18. At the same time, the molten pool 18 is subject to heating by a high energy source, in this case a focused laser beam 20 generated by a laser 21, that further melts the wire 16 and, if a welding process, a portion of the metallic workpiece 10 (i.e., the base metal) to form the puddle 18.

Since the workpiece 10 is moving relative to nozzle 12 and the high energy source 20, the molten metal comprised of molten wire and, if a welding process, molten workpiece metal, exiting the incidence area of the high energy beam 20 cools and solidifies to form a clad layer, or if a welding process, a weld, 22.

In this illustrative process, shielding gas 24 is also provided via the nozzle 12.

The high energy spot generated on the workpiece by the high energy source typically is about 3 mm in diameter.

However, the present disclosure provides one or more embodiments where a wider, relative to the direction of travel, spot is generated.

Figure 2:
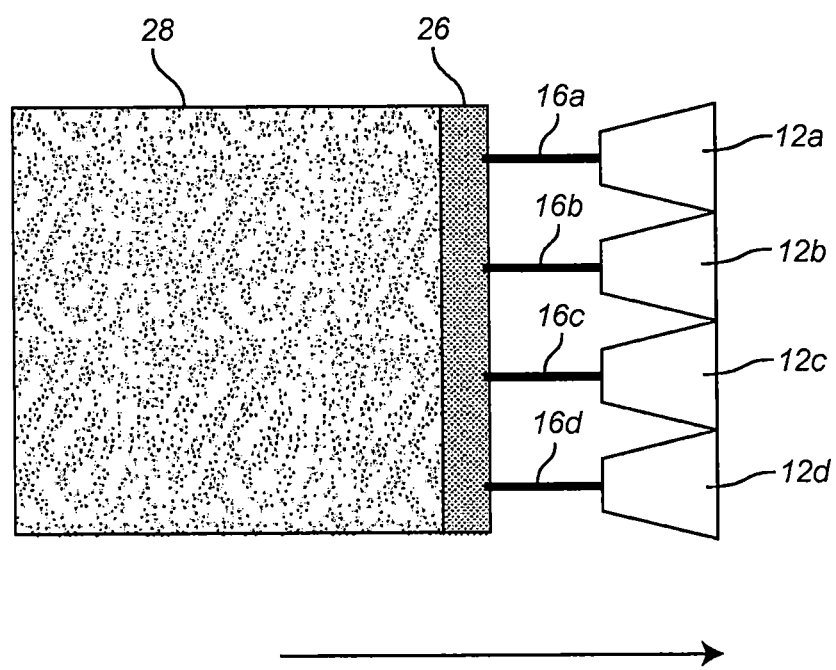
FIG. 2 illustrates in plan view a welding process embodying principles of the disclosure in which multiple wires are employed.

In FIG. 2, there is illustrated a welding process in which multiple wires 16a-16d are fed in parallel from respective nozzles 12-12d to a wide high energy spot 26. In this embodiment, the high energy beam is again a laser beam, but the footprint of the spot 26 is rectangular. Further, the footprint has a width W in a direction other than the direction of travel that is greater than that normally used for a single wire. In the illustrated embodiment, the footprint spans a distance orthogonal to the direction of travel that accommodates four wires.

As a result, a wide weld or deposited clad layer 28 essentially has the same width W and can be characterized as a wide path.

As in the process of FIG. 1, in the process of FIG. 2, the wires 16a-16b are preheated using known hotwire resistive heating techniques and shielding gas may or may not be employed.

In accordance with principles herein, the wires 16a-16d can be preheated using the same or different power levels. The use of different independent power levels enables independent control of the wires, and an ability to control the profile of the resultant weld or clad 28.

Figure 3:
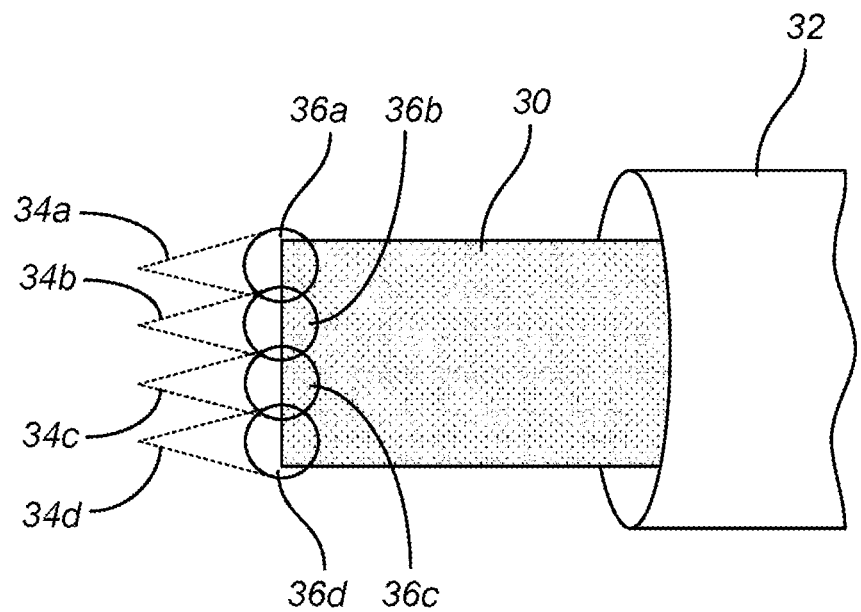
FIG. 3 illustrates in plan view a welding process embodying principles of the disclosure in which a wide wire ribbon is used.

In accordance with other principles depicted in FIG. 3, instead of a multiple wires 16a-16d, a single flat ribbon 30 made of filler wire material may be employed. A suitable nozzle 32 is used to feed the flat ribbon filler wire 30. The opening of the nozzle 32 could be oblong or flattened to better accommodate the shape of the ribbon 30. The use of a single ribbon may provide for a more continuous deposition of filler material across the welding or cladding path.

Also depicted in FIG. 3 is the use of multiple energy beams 34a-34d, e.g., laser beams, to generate the molten puddle. The footprints 36a-36d of the beams are shown as overlapping to the extend necessary to provide the most uniform overall high energy beam spot on the workpiece. Of course, independent control of the beam sources to provide differently sized footprints and/or energy levels may enable the generation of different profiles in the resultant deposited weld or clad.

Figure 4:
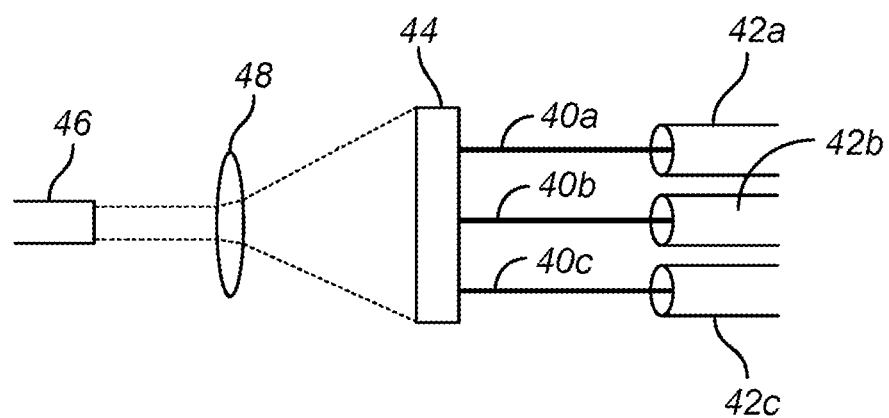
FIG. 4 illustrates in plan view a welding process embodying principles of the disclosure in which an energy spot with a rectangular footprint is used.

In FIG. 4, there is illustrated an arrangement where multiple filler wires 40a-40c are fed in parallel from respective nozzles 42a-42c to a rectangular footprint of a high energy beam spot 44. In this arrangement, the high energy beam source is again a laser 46, and an optical system 48 is used to create the rectangular footprint. Such optical systems are known as homogenizers, and both reshape the beam into a rectangular shape, usually a square shape, and create a homogenous distribution of the energy of the beam across its footprint. One example is that provided by Laserline GmbH located in Mülheim-Karlich, Germany.

Further, a laser beam emitter and optical system combination effective to produce such a controlled shape is available from Coherent, Inc. which markets such lasers as using its "top hat" technology. In this technology, two Powell lenses are used. A Powell lens is an aspheric cylindrical lens that purposefully aberrates a collimated Gaussian input beam so that the energy is efficiently redistributed from the beam center to the edges in the far field.

In accordance with principles disclosed herein, advantageously, the resultant footprint may have a non-uniform distribution of energy for an improved resultant deposited weld or clad. In that regard, with an energy profile where the center of the footprint is cooler than edges of the footprint, e.g., a profile with a linear, geometrical or exponential change in the energy level proceeding from the center to the edges of the footprint, the molten wire will tend to better flow or distribute to the edges of the footprint, and this can result in a more uniform weld, clad or deposit.

In accordance with principles disclosed herein, the foregoing can be accomplished, e.g., in the Laserline optics. In these optics, the lens or lenses comprise a multitude of reflective surfaces at different angles. In the manufacture of the lens or lenses, these surfaces, including their angles, can be customized. With such customization an energy distribution profile can be specified and implemented, while maintaining an overall rectangular footprint.

With the rectangular shaped footprint, the shape can be square or non-square, and footprints of different sizes can be generated. Some suitable footprints measure 6 mm by 6 mm, 10 mm by 5 mm, or 12 mm by 6 mm. The achievable measurements are determined by the energy of the laser beam and the settings of the optical system.

In FIGS. 10A to 10E there are other laser footprints described and in FIGS. 11A to 11D there are various energy profiles described.

With a rectangular footprint, metal deposition rates of about 25 lbs./hour have been achieved. This contrasts with deposition rates of only 8 lbs./hour to 10 lbs./hour in conventional apparatus. These higher deposition rates are achieved due to the higher surface areas to which the metal can flow when be deposited.

Figure 5:
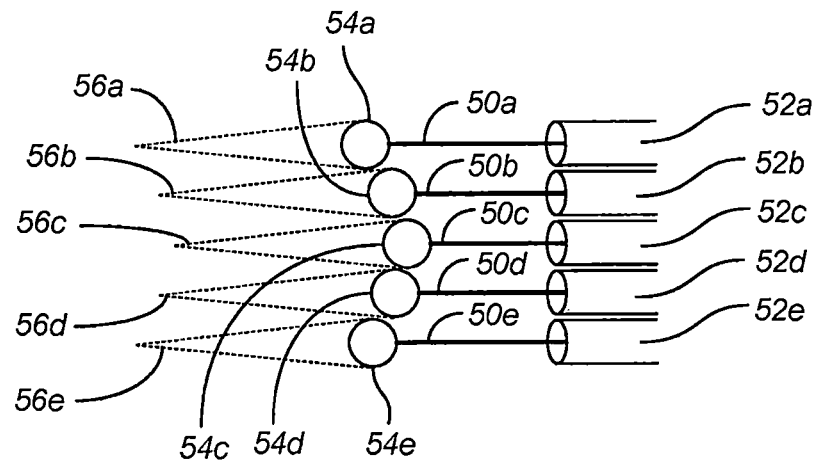
FIG. 5 illustrates in plan view a welding process embodying principles of the disclosure in which an angled weld spot is used.

If FIG. 5, there is illustrated an arrangement in which multiple filler wires 50a-50e are fed out of respective nozzles 52a-52e to respective high energy spots 54a-54e created by high energy beams 56a-56e. Although the footprints of the spots 54a-54e are shown as elliptical, they can be any suitable shape.

As also illustrated, the footprints 54a-54e are positioned to provide an overall "V" shape with the middle of the V in the middle of the deposition path, and the legs of the V extending toward a trailing edge of the path. Thus the middle of the V forms a leading point for the path.

Figure 6:
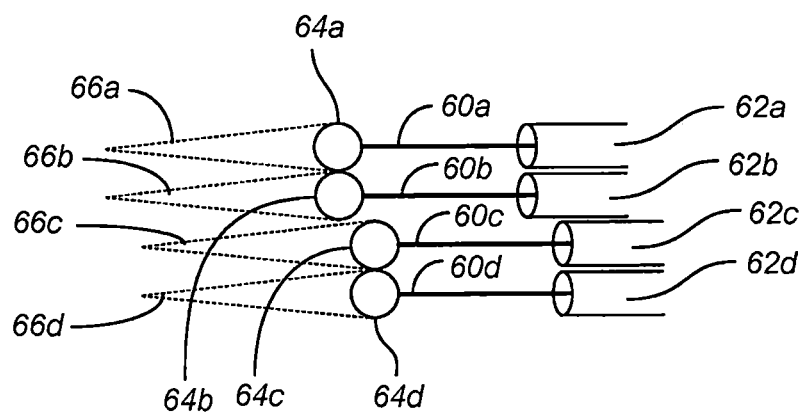
FIG. 6 illustrates in plan view a welding process embodying principles of the disclosure in which adjacent, but stair-stepped welding spots are used.

In FIG. 6, there is illustrated an arrangement in which multiple filler wires 60a-60d are feed out of respective nozzles 62a-62d to respective high energy spots 64a-64d created by high energy beams 66a-66d. In this arrangement, the spots are arranged stair-stepped with spots 64a and 64b define a first line and spots 64c and 64d define a second line that is offset from the first line along the deposition path.

Figure 7:
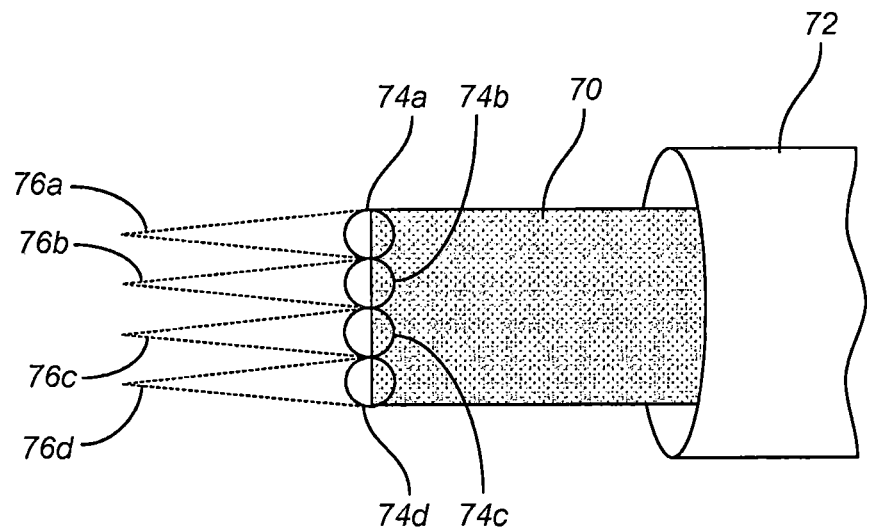
FIG. 7 illustrates in plan view a welding process embodying principles of the disclosure in which a ribbon wire is fed to a weld puddle irradiated by plural energy beams of different strengths and/or diameters.

In FIG. 7, there is illustrated an arrangement in which a ribbon filler wire 70 is feed out of a nozzle 72 to a line of high energy spots 74a-74d created by respective high energy beams 76a-76d. In this arrangement, the points of incidence of the high energy beams are arrayed along a straight line that is orthogonal to the deposition path. The individual footprints of the beams vary in size and/or the energy levels of the beams can vary to provide a varied profile to the weld or clad. In this embodiment, the beams are shown to varying in a descending or increasing order, however, any order could be used.

Figure 8:
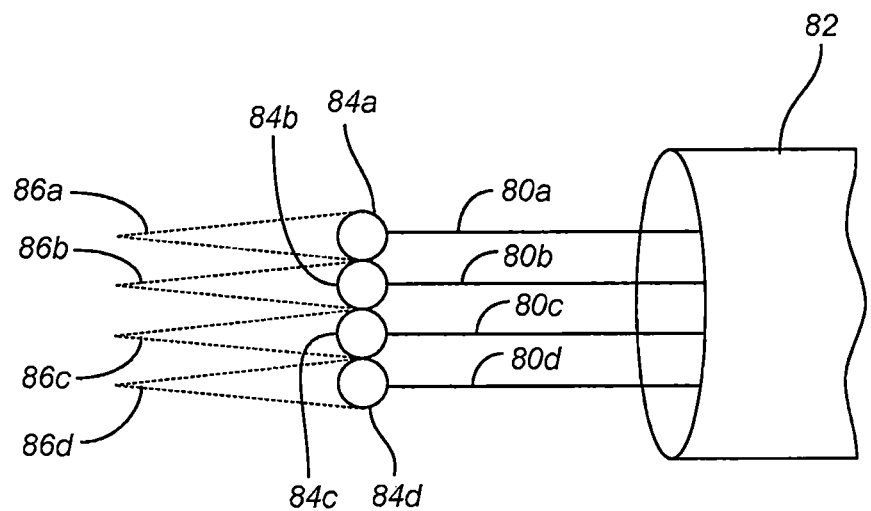
FIG. 8 illustrates in plan view a welding process embodying principles of the disclosure in which multiple wires are fed from a common nozzle to a weld puddle irradiated by plural energy beam of the same or different strengths and/or diameters.

In FIG. 8, there is illustrated an arrangement in which a plurality of filler wires 80a-80d are fed out of a wide nozzle 82 to a line of high energy spots 84a-84d created by respective high energy beams 86a-86d. In this arrangement, the points of incidence of the high energy beams are arrayed along a straight line that is orthogonal to the deposition path. The energy beams can be of the same energy level or different energy levels. The individual footprints of the beams can be the same or vary in size. Again, varying the energy levels and/or the footprints can vary the deposition profile as discussed above.

In the preceding embodiments, the multiple spots under determinable circumstances by a single elongate spot as described in connection with FIG. 4. Further, the multiple spots can be allowed to overlap, as described in connection with FIG. 3. The degree of overlap would be determined, at least in part, by the energy level profiles of the spots.

Figure 9:
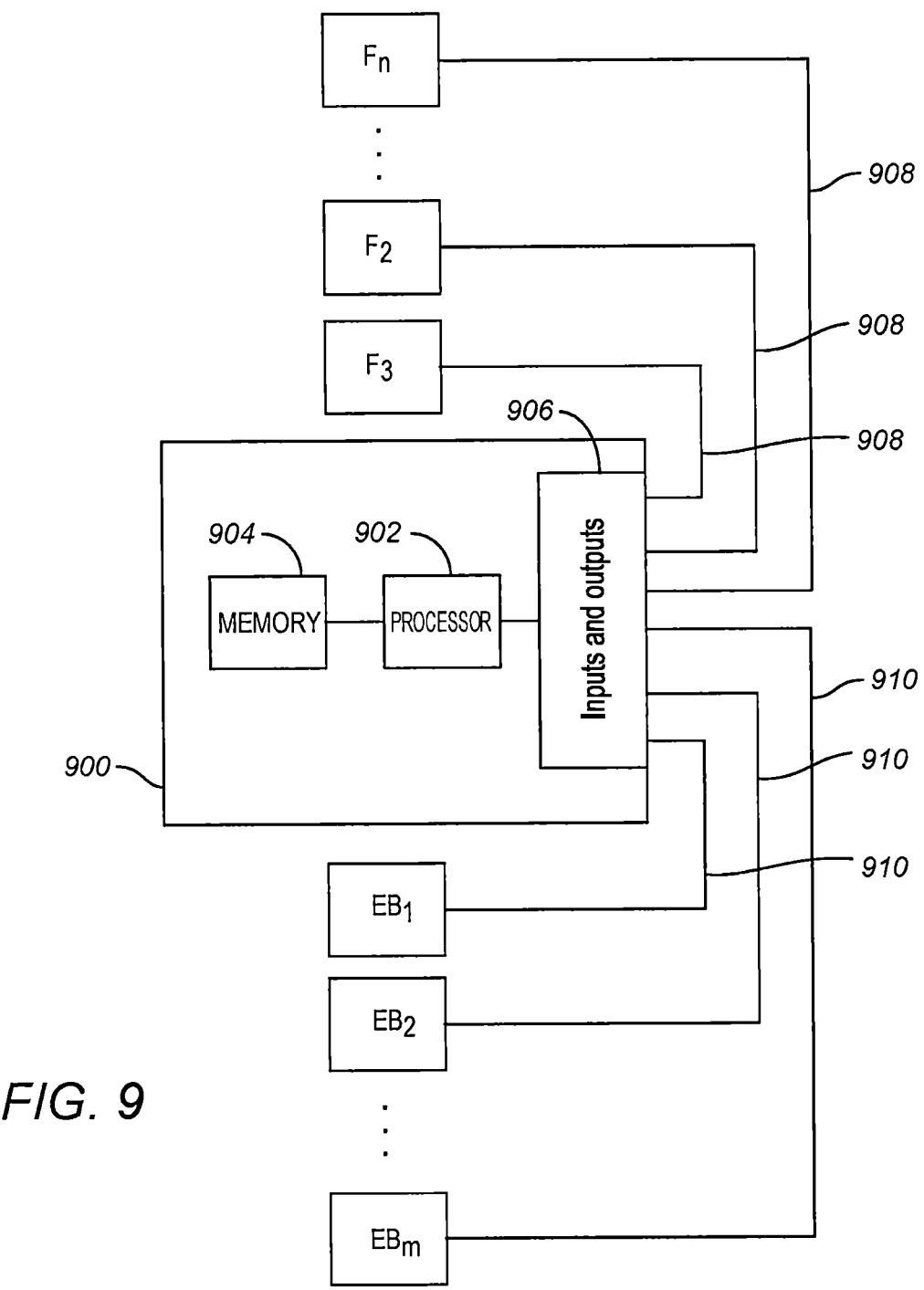
FIG. 9 illustrates a control schematic for controlling plural wire feeders and plural high energy sources.

In FIG. 9, there is illustrated a block diagram schematic of a control arrangement for controlling plural wire feeders $F_1, F_2 \ldots F_n$ and plural high energy sources $EB_1, EB_2 \ldots EB_m$. The feeders and energy sources may or may not be equal in number.

As illustrated, control circuitry 900 includes a processor or processing core 902 and memory 904 storing instructions executed by the processor or processing core 902. The processor/processing core 902 is in communication with an input/output module 906 comprised of one or more submodules that generate the necessary control signals and that receive any feedback signals from the wire feeders and high energy sources. The input/output module 906 in turn is in communication via suitable cables or links 908 and 910 to the various feeders and high energy sources, respectively. With respect to the wire feeders in particular, the signals and commands can include appropriate signals for controlling preheating of the wires, if appropriate. In this arrangement, the feeding of a desired number of wires can be controlled as well an appropriate number of high energy sources to effect the deposition of metal in a desired profile, such as those described above.

Figure 10A:
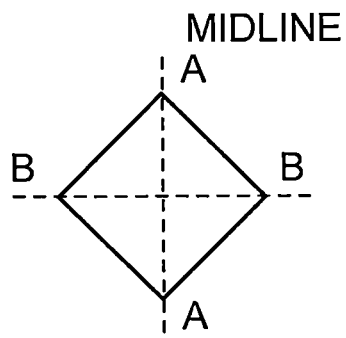
FIGS. 10A to 10E illustrate various laser footprints that can be used to provide a wide path in accordance with principles disclosed herein.
Figure 10B:
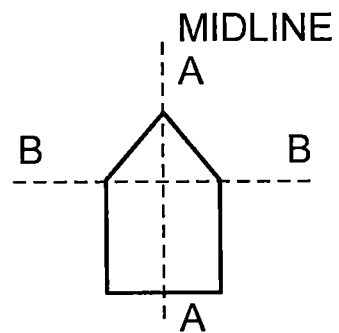
Figure 10C:
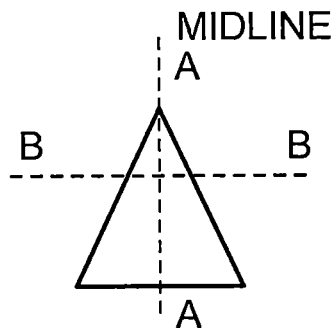
Figure 10D:
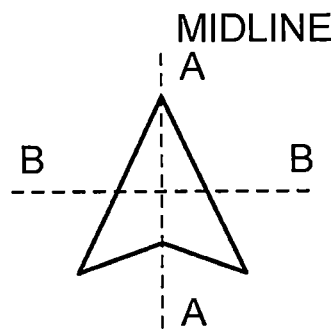
Figure 10E:
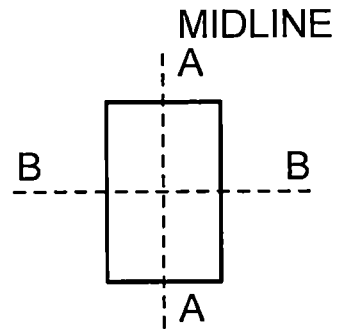

In FIGS. 10A to 10E there are illustrated various laser/high energy footprints or spots that might be achieved by appropriate customization of the Laserline optics discussed above. In addition to a square shape, the shapes can be a triangular shape as shown in FIG. 10A, diamond shape or the combination of two triangular footprints as shown in FIG. 10B, a house or baseball home plate shape or the combination of a rectangular footprint and a triangular footprint as shown in FIG. 10B, an arrowhead shape of another combination of two triangular footprints as shown in FIG. 10D. FIG. 10E shows another rectangular shape of the combination of two or more rectangular footprints. In each of FIGS. 10A to 10E there is shown a midline A-A for the resulting overall footprint along which the relative direction of travel lies. Further, there is illustrate a cross section line B-B useful for discussing power profiles in connection with FIGS. 11A to 11D.

Figure 11A:
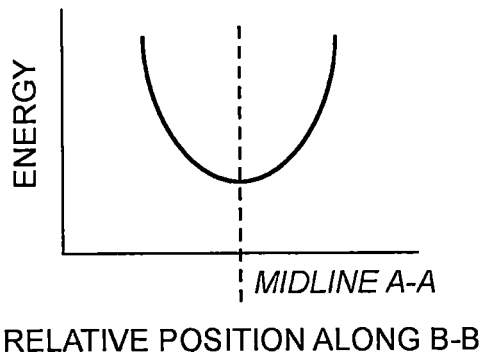
FIGS. 11A to 11D illustrate various relative power profiles that can exist along a cross section of a wide path footprint in accordance with principles disclosed herein.

In FIGS. 11A to 11D, there are shown various energy distribution profiles that can be across the cross sections B-B of the laser/high energy footprints, the profile selected being dependent upon the desired result. In FIG. 11A there is illustrated a profile that is generally ellipsoid and symmetric about the midline A-A. In FIG. 11A, power is lower at the midline that at the outer edges of the footprint.

Figure 11B:
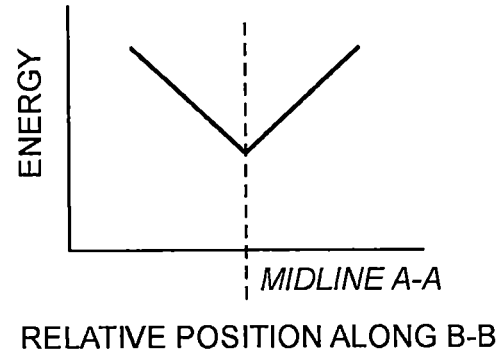

In FIG. 11B there is illustrated a profile that is generally linear about each side of midline A-A, with power at the midline being lower than power at the edges of the footprint. Since the power profiles are symmetric about the midline A-A, and with linear slopes on each side of the midline, the overall shape is a "V" shape.

Figure 11C:
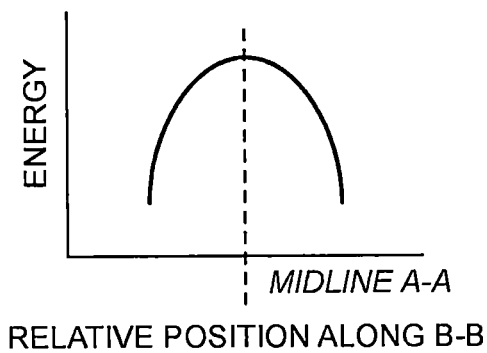

In FIG. 11C, there is illustrated a profile that also is generally ellipsoid and symmetric about the midline A-A, but is inverted with respect to the profile in FIG. 11A. Thus the overall impression is that of an inverted "U" shape, where power is greater at the midline than at the edges of the footprint.

Figure 11D:
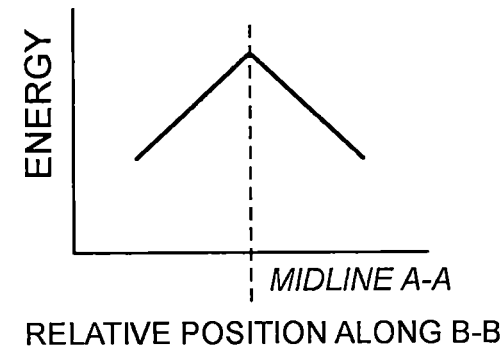

In FIG. 11D, there is illustrated a profile that is inverted with respect to the profile of FIG. 11B. In this profile power is greater at the midline and lower and the edges. Due to the symmetrical linear sloping of the power distribution from the midline, the profile has an overall shape of a Caret symbol.

As can be appreciated, the different profiles that might be used are limited only by the implementing technology. Thus, these profiles are meant only to be representative and not limiting. Similarly, the footprints that might be created are also limited only by the implementing technology. Thus, the illustrated footprints are meant only to representative and not limiting.

In FIGS. 12A to 12J further beam cross section are shown. FIG. 12A shows an ellipse shape with an energy profile that proceeds from a relatively higher energy center portion to a lower energy out portion. FIG. 12B shows a wide rectangular shape with an energy profile that proceeds from a relatively higher energy center portion to a lower energy out portion. FIG. 12C shows a square shape with an energy profile that proceeds from a relatively higher energy center portion to a lower energy out portion. FIG. 12D shows a square shape with two relatively higher energy edges on opposite sides of the square shape. FIG. 12E shows circular ring shape. FIG. 12F shows a circular shape with an energy profile that proceeds from a relatively higher energy center portion to a lower energy out portion. FIG. 12G shows a line shape with an energy profile that proceeds from a relatively higher energy center portion to a lower energy out portion. FIG. 12H shows two spaced apart circular shapes, each with an energy profile that proceeds from a relatively higher energy center portion to a lower energy out portion. FIG. 12I shows a liner shape with two pinpoint high energy spots along the linear shape. FIG. 12J shows a square shape with relative high energy pinpoint spots at the corners of the square shape and a perimeter with an energy level higher than that of a center of the square shape, but lower than that at the corners of the square shape.

Figure 13:
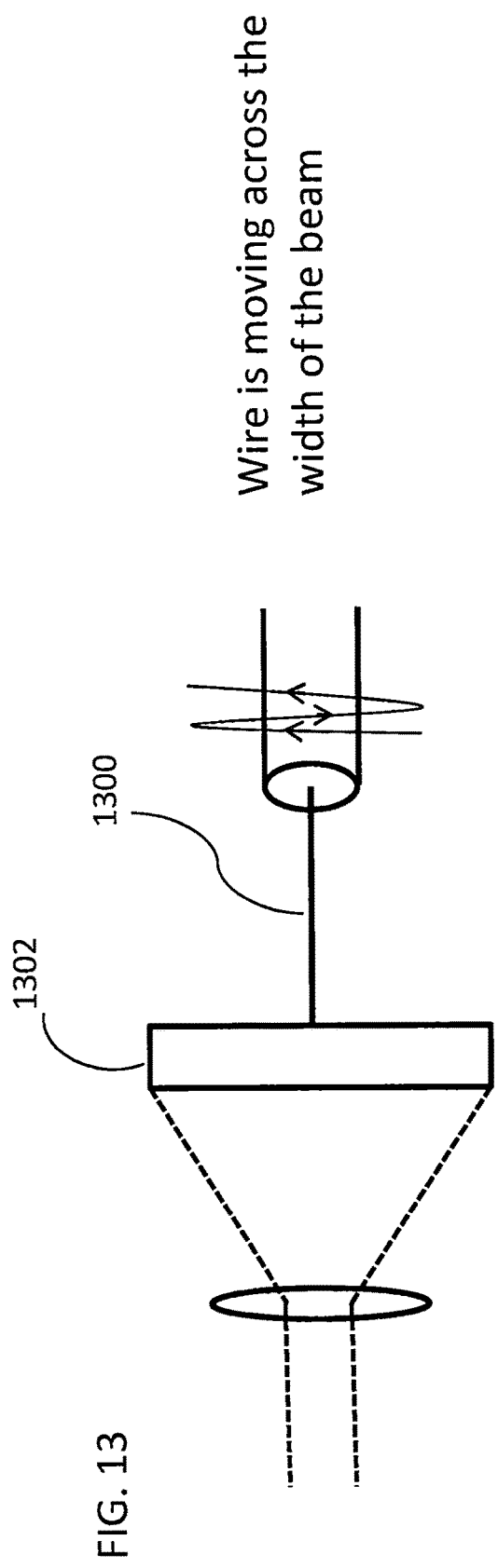
FIG. 13 illustrates a moving or wavering wire been feed into a wide energy beam footprint to obtain a wide path weld, clad, or deposit.
Figure 14:
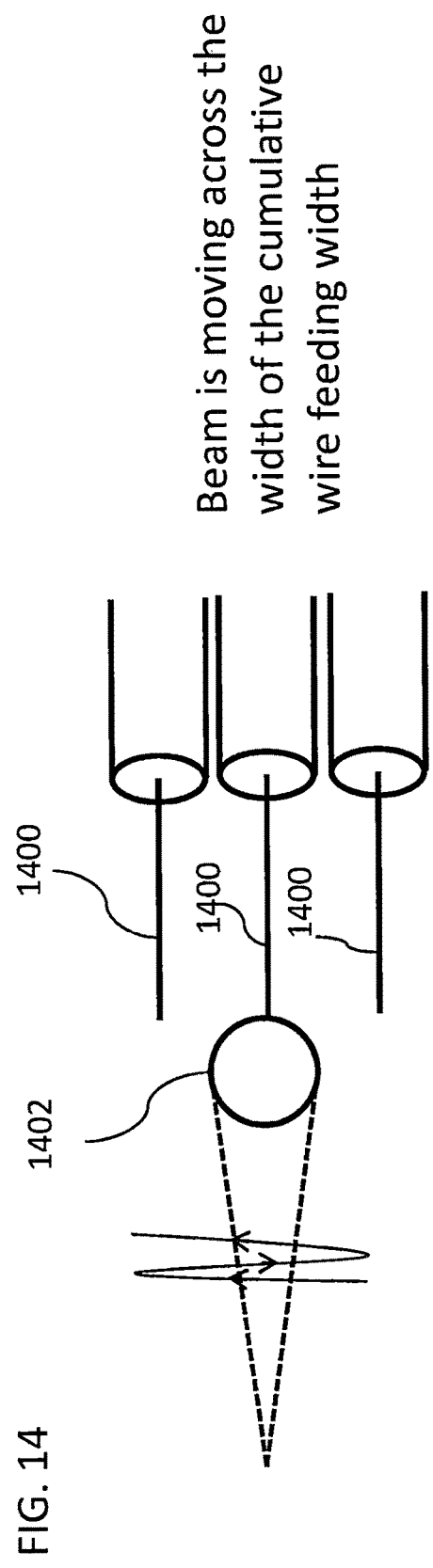
FIG. 14 illustrates plural filler wires been feed into a path irradiated by a moving or wavering energy beam to obtain a wide path weld, clad, or deposit.

As mentioned above, a wide path weld, clad, or deposit can be obtained where an energy spot and one or more wires are moved relative to each other. In FIG. 13, a wire 1300 is moved in a wavering fashion or in a spiral fashion so as to moving along the width dimension of a wide (in this illustration, rectangular) energy beam spot 1302. In this manner, only one wire need be feed to the beam spot to obtain a wide path weld, clad, or deposit of the melted wire. In FIG. 14, the opposite occurs. In FIG. 14, plural wires 1400 are fed unwaveringly onto a weld, clad, or deposit path irradiated by a moving or wavering energy beam spot 1402. In this way, a wide path weld, clad, or deposit can be obtained with only a small beam spot, and wire moving mechanisms are not needed.

Those of ordinary skill in the art will easily understand how the principles above are employed in welding, cladding and additive manufacturing operations and apparatus to provide wider metal depositions and varied deposition profiles, as desired.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A metalworking apparatus, comprising:
   two or more energy beam emitters arranged to irradiate a workpiece with two or more spots of high energy incident on the workpiece;
   a first wire feeder configured to feed a first wire to the two or more spots and which when melted by an energy beam of the two or more energy beams form a welding puddle;
   a second wire feeder configured to feed a second wire to the welding puddle, the second wire applied to the welding puddle adjacent to the first wire in a direction transverse to the welding path;
   an optical system configured to shape the one or more beams of energy to vary an intensity of the one or more spots of high energy incident on the workpiece; and
   circuitry for controlling the two or more energy beam emitters, the first and second wire feeders, and the optical system, the circuitry to:
      control the two or more energy beam emitters to emit each spot of the two or more spots having a width in a direction transverse to a direction of a welding path; and
      control the two or more energy beam emitters to focus the two or more spots on the workpiece to be adjacent or to overlap on the workpiece, the cumulative width of the two or more spots on the workpiece being greater than a length of the two or more spots in the direction of the welding path.

2. The apparatus of claim 1, comprising a plurality spots of the two or more spots continuously arrayed along a straight line.

3. The apparatus of claim 2, wherein the width direction of the two or more spots is orthogonal to the welding path.

4. The apparatus of claim 2, wherein the width direction of the two or more spots is at an oblique angle to the welding path.

5. The apparatus of claim 1, wherein the cumulative width of the two or more spots is at least 4 mm.

6. The apparatus of claim 1, wherein the one or more energy beam emitters comprises a single energy beam emitter which emits a wide energy beam or a moving energy beam to create the welding puddle.

7. The apparatus of claim 1, comprising a plurality energy beam emitters which emit energy beams of equal cross-section and intensity.

8. The apparatus of claim 1, wherein the one or more energy beam emitters comprises a plurality energy beam emitters which emit energy beams with different energy intensities.

9. The apparatus of claim 1, wherein each energy beam emitter of the one or more energy beam emitters is a laser.

10. The apparatus of claim 5, wherein an intensity of the high energy incident on the workpiece varies across the one or more spots.

11. The apparatus of claim 1, wherein the optical system is configured to shape the one or more spots to create a footprint on the workpiece.

12. The apparatus of claim 11, wherein the optical system is configured to control one or more of an energy distribution or a size of the one or more spots on the workpiece.

13. The apparatus of claim 1, wherein the circuitry is further configured to control the two or more energy beam emitters to vary an intensity of the high energy incident on the workpiece across the cumulative width of the one or more spots.

14. A metalworking apparatus, comprising:
   one or more lasers arranged to irradiate a workpiece with one or more beams of energy forming one or more spots of high energy incident on the workpiece;
   an optical system configured to shape the one or more beams of energy to vary an intensity of the one or more spots of high energy incident on the workpiece;
   a first wire feeder configured to feed a first wire to the one or more spots and which when melted by the one or more beams of energy form a welding puddle;
   a second wire feeder configured to feed a second wire to the welding puddle, the second wire applied to the welding puddle adjacent to the first wire, each spot of the one or more spots having a width in a direction transverse to a direction of a welding path and a length along the direction off the welding path, a cumulative width of the one or more spots being greater than a length of the one or more spots; and
   circuitry for controlling each laser of the one or more lasers, the optical system, and the first and second wire feeders.

* * * * *